Patented Sept. 15, 1953

2,652,387

UNITED STATES PATENT OFFICE 2,652,387

PROCESS FOR PRODUCING CONDENSATION PRODUCTS OF POLYVINYL ALCOHOL AND ALDEHYDES

Wolfgang Gruber, Joseph Heckmaier, and Hugo Zoebelein, Burghausen, Germany, assignors, by mesne assignments, to Wacker-Chemie G. m. b. H., Munich, Germany, a corporation of Germany No Drawing. Application February 14, 1951, Serial No. 210,988. In Germany February 17, 1950

7 Claims. (Cl. 260—73)

This invention relates to producing condensation products of polyvinyl alcohol and aldehydes, and it has for its object to provide a novel and improved process for this purpose.

Another object of the invention is to provide a simple and efficient process for manufacturing condensation products of polyvinyl alcohol and saturated aldehydes in the form of grains which may be readily separated from other ingredients of the reaction mixture.

Still another object is to produce condensation products of polyvinyl alcohol and saturated aldehydes which are characterized by a high degree of stability and favorable mechanical properties.

Various other objects and advantages will be apparent as the nature of the invention is more fully disclosed.

In conventional processes for the production of condensation products from polyvinyl alcohols and aldehydes it is difficult to get the acetals to precipitate in granular form so that the accompanying materials may easily be removed by washing.

We have discovered, however, that this is possible if the condensation is performed with polyvinyl alcohol dissolved in water and a saturated aldehyde in the presence of perchloric acid as a catalyst. The concentration of perchloric acid in the reaction mixture is in general very small, preferably below 5 percent. The content of ester groups in the polyvinyl alcohol is not critical. As aldehydes, those with at least two carbon atoms, or their mixtures, may be used. The condensation may be performed at room temperature or at elevated temperatures. The acetals precipitate in fine grains, and therefore have a good filterability and are very easily separated from the by-products by washing.

We have found it advantageous to separate the reaction product only after a certain time, preferably after at least one hour, and then to wash it out. When this is done, the acetal content is increased by a few percents, and the solubility of the condensation product changes so that it becomes soluble in a wider range of solvents, for example hydroxyl group free solvents or mixtures thereof with alcohols, as well as such solvents with a higher proportion of esters, ketones, chlorine derivatives, etc. The products obtained are distinguished by excellent stability and favorable mechanical properties.

Example

Into a 10 percent aqueous solution of polyvinyl alcohol of high viscosity and a saponification number of 185 are added, while stirring, at 20° C., 5 percent of perchloric acid, based upon the water-free polyvinyl alcohol, and then 78 parts of butyraldehyde per 100 parts of solid polyvinyl alcohol. After a short time the acetal precipitates in the form of fine grains. It is filtered off, washed with water and dried. It shows the following analysis:

60.9 percent acetal, 14.1 percent acetate, 25 percent alcohol. The condensation product is soluble in any mixture of acetic ester and methanol, benzene and methanol, and also in methanol alone.

If the reaction materials are permitted to react with each other for an additional hour after the precipitation of the acetal, the acetal content increases to about 63.8 percent.

Although a specific example has been given herein for purposes of illustration, it will be evident to those skilled in the art that the invention is capable of various modifications and adaptations within the scope of the appended claims.

What we claim as new and desire to secure by Letters Patent of the United States is:

1. Process for producing condensation products from polyvinyl alcohol and saturated aldehydes with at least two carbon atoms by condensing the polyvinyl alcohol in aqueous solution with the saturated aldehyde in the presence of a catalyst which comprises using perchloric acid as catalyst, whereby the reaction product is precipitated.

2. Process according to claim 1, employing perchloric acid in an amount not greater than 5 percent, based upon the water-free polyvinyl alcohol used.

3. Process for producing condensation products from polyvinyl alcohol and saturated aldehydes with at least two carbon atoms, by condensing the polyvinyl alcohol in aqueous solution with the saturated aldehyde in the presence of a catalyst which comprises using perchloric acid as a catalyst and allowing the precipitated reaction product to remain in the reaction mixture at least one hour before separating it from the reaction mixture and washing it.

4. Process according to claim 3, employing perchloric acid in an amount not greater than 5 percent, based upon the water-free polyvinyl alcohol used.

5. Process for producing condensation products from polyvinyl alcohol and saturated aldehydes with at least two carbon atoms, which comprises condensing the polyvinyl alcohol in aqueous solution with the saturated aldehyde in the presence of perchloric acid as a catalyst for at least one hour, and then separating the condensation product from the reaction mixture.

6. Process for producing condensation products from polyvinyl alcohol and saturated aldehydes with at least two carbon atoms, which comprises condensing the polyvinyl alcohol in aqueous solution with the saturated aldehyde in the presence of perchloric acid as a catalyst for at least one hour at room temperature, and then separating the condensation product from the reaction mixture.

7. Process for producing condensation products from polyvinyl alcohol and saturated aldehydes with at least two carbon atoms, which comprises condensing the polyvinyl alcohol in aqueous solution with the saturated aldehyde in the presence of perchloric acid as a catalyst for at least one hour at about 20° C., and then separating the condensation product from the reaction mixture.

WOLFGANG GRUBER.
JOSEPH HECKMAIER.
HUGO ZOEBELEIN.

References Cited in the file of this patent

UNITED STATES PATENTS

| Number | Name | Date |
| --- | --- | --- |
| 2,358,355 | Stamatoff | Sept. 19, 1944 |
| 2,422,754 | Stamatoff | June 24, 1947 |